March 18, 1969    A. ADDY    3,433,184
NESTABLE PALLETS
Filed Dec. 11, 1967    Sheet 1 of 2
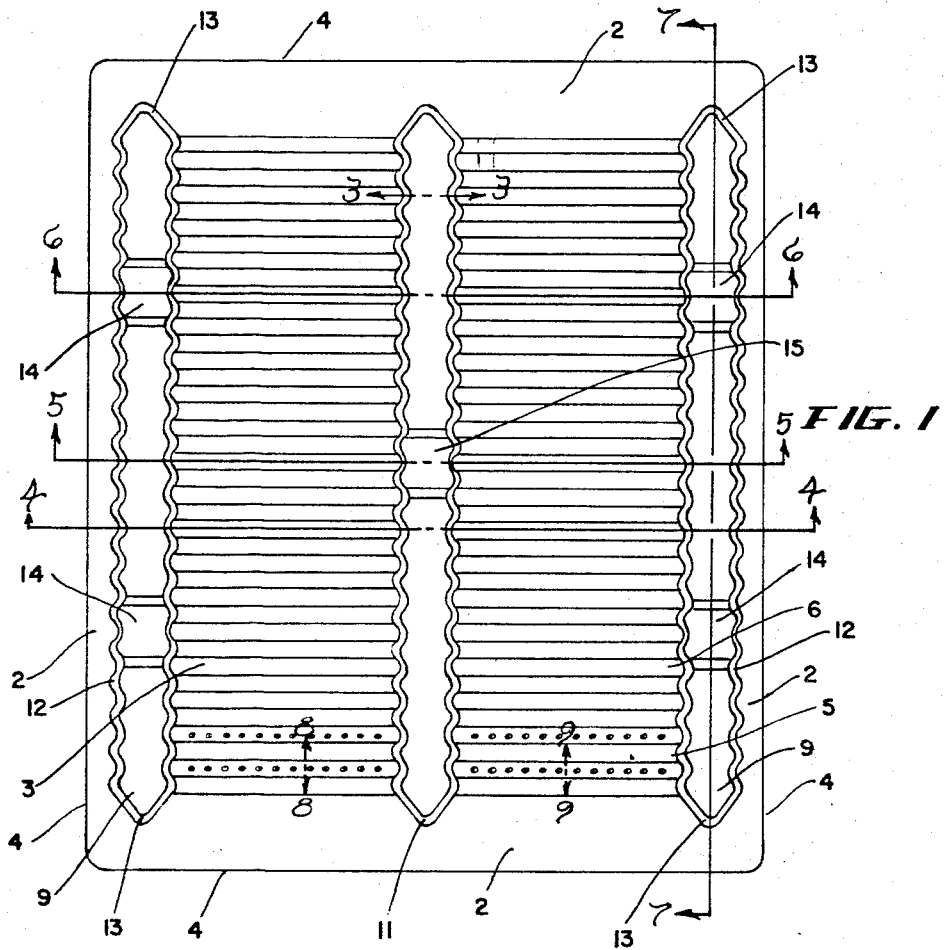
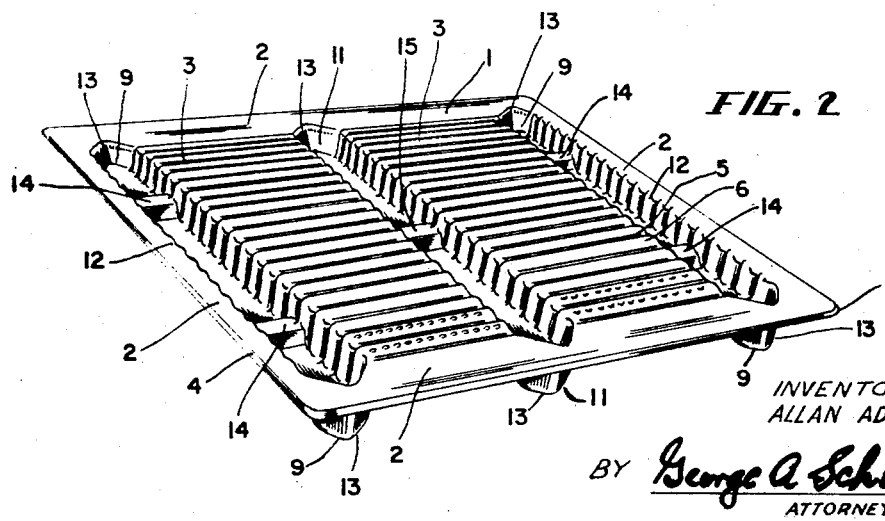
INVENTOR
ALLAN ADDY
BY George A. Schwenger
ATTORNEY

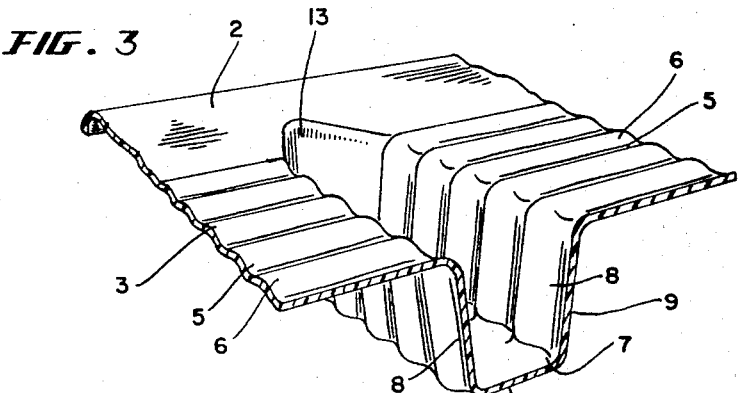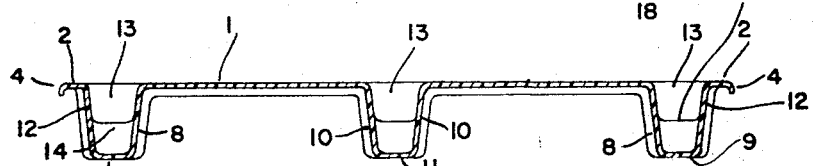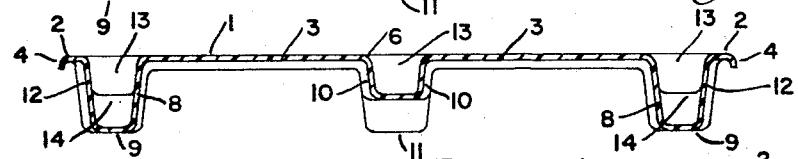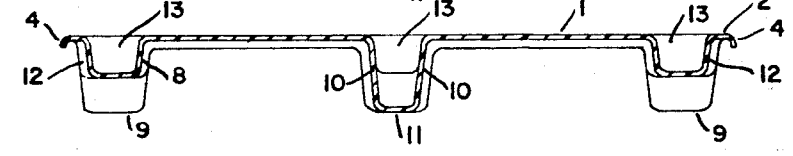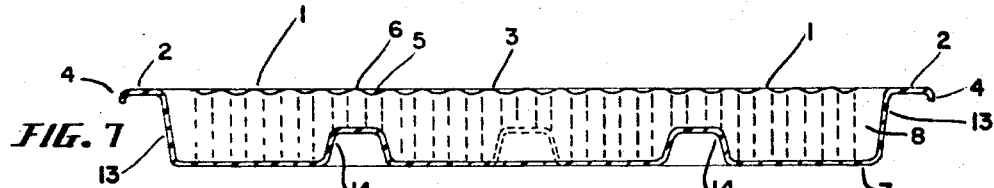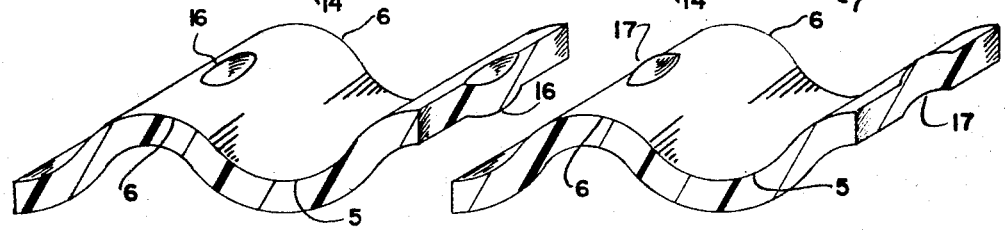
INVENTOR
ALLAN ADDY
BY George A. Schwenger
ATTORNEY

United States Patent Office 3,433,184
Patented Mar. 18, 1969

3,433,184
NESTABLE PALLETS
Allan Addy, 3169 Mary Jane Drive,
Cincinnati, Ohio 45211
Filed Dec. 11, 1967, Ser. No. 689,477
U.S. Cl. 108—53      4 Claims
Int. Cl. B65d *19/38*

ABSTRACT OF THE DISCLOSURE

The application discloses a pallet formed from a sheet of plastic having a formed reinforcement around the entire perimeter of the pallet. In general, the pallet comprises a corrugated top with the corrugations extending downward into channels to reinforce the top and the channels. The channels provide legs and are transverse of the corrugations. In addition there are other channels crosswise in the transverse channels. The channels are formed with tapered sides to permit a series of pallets to be nested on top of each other when the pallets are not loaded and can be stored in a relative small area. In the ridges of the corrugations there are concave depressions adapted to secure packages from sliding on the pallet where friction by reason of stacked cartons or packages is not sufficient to keep the stacked material from sliding on the pallet. As an alternate, convex nodules are spaced on the ridges of the corrugations to grip packages and cartons while in position on the pallet.

---

There are many types of pallets formed from sheet material that lack resistance to bending and as a consequence are short lived due to breaking. This defect is particularly true on most of the pallets now in use. A critical part of any pallet is the outer perimeter especially when formed from sheet material. If the perimeter of the top of the pallet is not reinforced, it is subject to fracture and cracking which fracture or crack travels across and results in break line clear across the pallet. In some cases, reinforcement is provided by other means that are attached or imbedded in the material thereby requiring additional parts in conjunction with the sheet material from which they are formed. This additional part is not necessary with my reinforced edge.

It is an object of my invention to produce a pallet from sheet material wherein corrugations are provided for strength, channels reinforced by the corrugations depressed from the sheet material to provide legs and a curved edge in the perimeter around the pallet to reinforce the edges around the pallet.

Another object of my invention is to provide a pallet, formed from sheet material, having a corrugated top surface with legs formed by channels extending down from the top surface and the corrugations of the top surface continuing and extending down the sides of the channels and having other channels inverted and cross wise of the transverse channels to prevent flexing of the top and the channels, together with a curved perimeter around the pallet to reinforce the edges of the pallet to prevent bending and cracking of the edges.

Another object of my invention is to provide a pallet with spaced legs having bottoms of sufficient area so that loaded pallets can be stacked without rupturing or forming impression on packages supported on other pallets below a succeeding upper pallet.

A further object of my invention is to provide a pallet from sheet material whereby the sheet material is deformed to produce a corrugated top with concave depressions in the crown of the corrugations, channels depressed from the top having corrugated tapered sides, the channels being transverse of the corrugated top and other channels cross wise within the transverse channels and a curved perimeter around the edges of the pallet.

In the drawings:
FIGURE 1 is a top plan view of my pallet.
FIGURE 2 is a perspective view of my pallet.
FIGURE 3 is a perspective view of a fractional part of my pallet in section.
FIGURE 4 is a section in elevation taken on line 4—4 of FIGURE 1.
FIGURE 5 is a section in elevation taken on line 5—5 of FIGURE 1.
FIGURE 6 is a section in elevation taken on line 6—6 of FIGURE 1.
FIGURE 7 is a section in elevation taken on line 7—7 of FIGURE 1.
FIGURE 8 is a perspective of a part of a corrugation showing concave depressions in the ridges of the corrugations.
FIGURE 9 is a perspective of a part of a corrugation showing convex nodes in the ridges of the corrugations.

My pallet has a top 1 with a plane flat surface area 2 surrounding a corrugated inner area 3. The plane surface area has rounded edges 4 around the entire perimeter of the top of the pallet to reinforce perimeter edges of the pallet. The rounded edges prevent fracture and also stiffen the edges thereby making them highly resistant to flexure. Corrugations are formed and have grooves 5 and ridges 6 and the corrugations extend from a bottom 7 up sides 8 of transverse end channels 9—9 across the top and down sides 10 of another center transverse channel 11. The channels have flat bottoms 18 of sufficient area to prevent the bottoms from puncturing or rupturing or marking packages stored on pallets underneath a pallet stacked on top of the bundles and packages. Other corrugations are formed in sides 12 of the transverse end channels 9. The transverse channels have closed ends 13 thereby forming supporting legs for the pallet secured against collapsing at the ends of the transverse channels. The sides of the transverse channels are tapered and are wider at the top thereby facilitating the nesting of one pallet with another to stack them when not in use and stored for future use. The transverse end channels have spaced inverted cross channels 14 that span between the sides 8 and 12 of these channels that secure the sides from flexing. These cross channels are shallow and end short of the top of the pallet. Another cross channel 15 is secured in the center of the center transverse channel. The spaces on the underside of the pallet between the transverse channels provide clearance for tines of a lift truck for raising and moving loaded pallets.

A multiple of concave depressions are formed in the ridges of the corrugations. These depressions 16 allow wrappings on packages to be depressed in the concave depressions and hold the packages from sliding on the load bearing surface of the pallet. As an alternate, a multiple of convex nodes 17 are provided on the ridges of the corrugations and these nodes penetrate but do not rupture the wrappings on packages and these nodes prevent the packages from sliding on the load bearing surface of the pallet.

My pallets are made by the well known thermo forming over a master die process. The sheet material is domed over the die rather than flat wise over the die before forming. The doming of the sheet material provides extra material which flows down into the channels to maintain a relative uniform thickness of all parts of my pallet. A sheet of material cut to the exact dimensions of a formed pallet results in a thinning of the formed parts. This thinning is overcome by my method of making the sheet of material larger than the exact dimensions of the formed pallet and the oversize of the sheet permits doming over the die.

Having described my invention, I claim:

1. A one-piece reinforced pallet formed of sheet material and adopted to be engaged and transported by the tines of a fork lift truck, said pallet comprising:

a generally rectangular panel formed of sheet material having an upper load-bearing surface;

a plurality of reinforcing channels extending longitudinally of said rectangular panel and depressed downward from said upper load-bearing surface;

said channels each comprising a pair of spaced side walls having upper edges joined to the said panel and having a flat bottom wall joined to the lower edges of the side walls;

the flat bottom walls of said channels adapted to rest upon a floor surface with the load-bearing panel spaced upwardly to receive the tines of a fork lift truck in the space between the said channels for lifting and transporting the pallet;

said panel having flat marginal portions extending about the sides thereof and delineating the load-bearing surface of the panel;

a series of corrugations formed in said panel and extending transversely of the said channels within the area delineated by the marginal portions of the panel for reinforcing the panel;

said corrugations having convex ridges disposed in the plane of the flat marginal portions of the panel and delineating the said load-bearing surface;

said corrugations having extended end portions formed in the side walls of the said channels and terminating at the flat bottom walls thereof for increasing the load-bearing capacity of the channels;

the said longitudinal reinforcing channels each include at least one inverted cross channel formed therein and extending transversely between the side walls of the longitudinal reinforcing channel, each of said inverted cross channels comprising a pair of spaced side walls extending upwardly from the flat bottom wall of the longitudinal channel, said inverted cross channel reinforcing the side walls of the longitudinal channels and increasing the load-bearing capacity of the pallet.

2. A one-piece reinforced pallet as set forth in claim 1, in which the said transverse corrugations comprise alternate concave depressions and convex ridges disposed in a common plane and delineating the load-bearing surface of the pallet;

and convex ridges including a plurality of spaced nodes projecting upwardly from the convex ridges above the upper load-bearing surface of the pallet.

3. A one-piece reinforced pallet as set forth in claim 1, in which the said transverse corrugations comprise alternate concave depressions and convex ridges disposed in a common plane and delineating the load-bearing surface of the pallet;

and convex ridges including a plurality of spaced concave depressions depressed below the plane of the convex ridges which delineate the plane of the load-bearing surface.

4. A one-piece reinforced pallet as set forth in claim 1, in which the flat marginal portions which extend about the sides of the panel have outer edge portions which curve outwardly and downwardly from the top plane of the flat marginal portions, said downwardly curved outer edge portions stiffening the marginal portions and increasing the load-bearing capacity of the pallet.

References Cited

UNITED STATES PATENTS

| | | | |
|---|---|---|---|
| 3,140,672 | 7/1964 | De Luca | 108—58 XR |
| 3,167,341 | 1/1965 | Higgins | 108—58 XR |
| 3,187,689 | 6/1965 | Hess | 108—58 |
| 3,187,691 | 6/1965 | Leitzel | 108—58 |
| 3,228,358 | 1/1966 | Sere et al. | 108—58 |
| 3,277,849 | 10/1966 | Talbot | 108—58 |
| 3,359,929 | 12/1967 | Carlson | 108—58 |

BOBBY R. GAY, *Primary Examiner.*

G. O. FINCH, *Assistant Examiner.*

U.S. Cl. X.R.

108—58